No. 795,732. PATENTED JULY 25, 1905.
C. D. PURDY.
TIRE.
APPLICATION FILED AUG. 17, 1904.

2 SHEETS—SHEET 1.

Witnesses
Carl D. Purdy
Inventor
Harry Ellis Chandler
Attorneys

No. 795,732. PATENTED JULY 25, 1905.
C. D. PURDY.
TIRE.
APPLICATION FILED AUG. 17, 1904.

2 SHEETS—SHEET 2.

Witnesses
Inventor
Carl D. Purdy
By
Attorneys

UNITED STATES PATENT OFFICE.

CARL D. PURDY, OF GLADWIN, MICHIGAN.

TIRE.

No. 795,732.  Specification of Letters Patent.  Patented July 25, 1905.

Application filed August 17, 1904. Serial No. 221,108.

*To all whom it may concern:*

Be it known that I, CARL D. PURDY, a British subject, residing at Gladwin, in the county of Gladwin and State of Michigan, have invented certain new and useful Improvements in Tires; and I do hereby declare the following to be a full, clear, and exact description of the invention, such as will enable others skilled in the art to which it appertains to make and use the same.

This invention relates to tires, and more particularly to the class of cushion-tires, and has for its object to provide a tire which will be extremely resilient and in which the disadvantages common to pneumatic tires will be eliminated.

Other objects and advantages will be apparent from the following description, and it will be understood that changes in the specific construction shown and described may be made without departing from the spirit of the invention.

Figure 1:
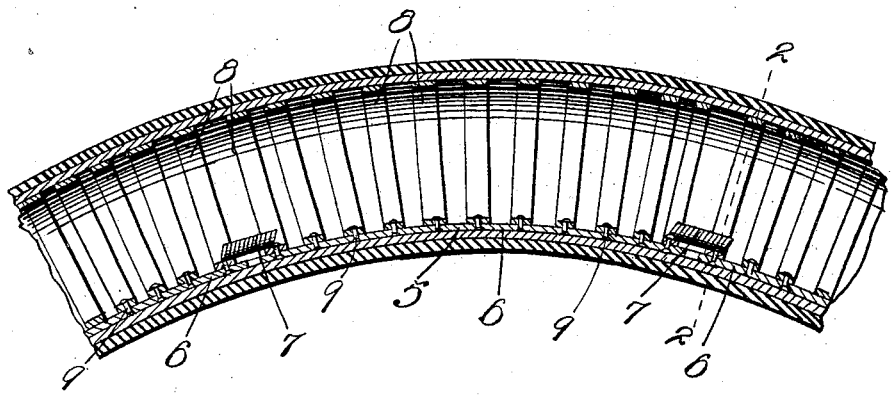
Figure 2:
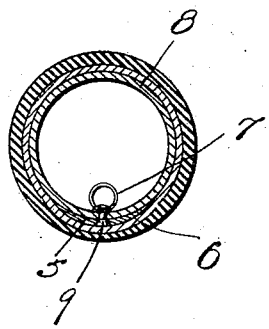
Figure 3:
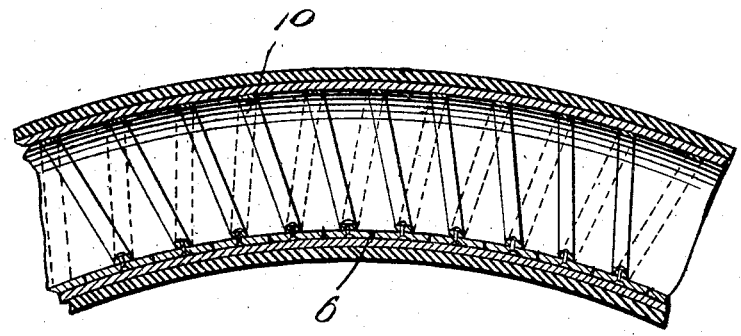
Figure 4:
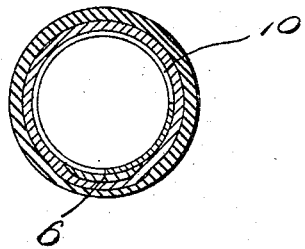

In the drawings forming a portion of this specification, and in which like numerals of reference indicate similar parts in the several views, Figure 1 is a longitudinal section of a tire constructed in accordance with the present invention. Fig. 2 is a transverse section on line 2 2 of Fig. 1. Figs. 3 and 4 are views similar to Figs. 2 and 3 and showing a modified form of the invention.

Referring now to the drawings, the present tire (shown in Figs. 1 and 2) comprises a circular base 5, composed of a plurality of metallic plates 6, having a slight arc shape longitudinally and being curved also transversely in the opposite direction to their longitudinal curve. These plates are disposed end to end to form the complete circle and are connected by means of helical springs 7, as will be presently described. Secured to each of the plates 6 are a plurality of circular resilient metallic bands 8, which are attached thereto by means of rivets 9 passed through perforations in the bands and in the plates, and the springs 7 are engaged at their ends with the endmost rivets of the plates. A covering of fabric is provided for the bands and plates, as illustrated, and an outer coating of rubber covers the fabric.

In Figs. 3 and 4 the springs 7 are omitted and the bands 8 are replaced by a continuous helical spring 10, formed of flat metal, the convolutions of which are riveted to the plate 6, as shown. It will thus be apparent that in both forms of the invention the tire may be stretched to enable it to be applied to a wheel-rim, the springs 7 permitting of this stretching in the first-described form and the spring 10 permitting it in the second form. It will of course be understood that the second form is also provided with the coverings of fabric and rubber.

What is claimed is—

1. A tire comprising a plurality of arcuate plates disposed in position to form a complete circle, springs secured to the plates and connecting the latter one with another, and resilient loops secured to the plates and extending upwardly therefrom, and a cover for the loops and plates.

2. A tire comprising a plurality of arc-shaped plates having resilient loops disposed against the plates and secured thereto, and a cover for the plates and loops.

3. A tire comprising a plurality of arc-shaped plates disposed to form a complete circle, resilient loops disposed against the plates, rivets passed through the loops and plates to hold them together and springs engaged in the rivets at the meeting ends of the plates to hold the plates one to another.

In testimony whereof I affix my signature in presence of two witnesses.

CARL D. PURDY

Witnesses:
JOHN DEWE,
C. H. FAIRCHILD.